US012774903B2

(12) United States Patent
Machinaka

(10) Patent No.: US 12,774,903 B2
(45) Date of Patent: Oct. 27, 2026

(54) INFORMATION PROCESSING DEVICE AND INFORMATION PROCESSING METHOD

(71) Applicant: SONY GROUP CORPORATION, Tokyo (JP)

(72) Inventor: Noriaki Machinaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 10 days.

(21) Appl. No.: 18/849,735

(22) PCT Filed: Mar. 17, 2023

(86) PCT No.: PCT/JP2023/010571

§ 371 (c)(1),
(2) Date: Sep. 23, 2024

(87) PCT Pub. No.: WO2023/189721

PCT Pub. Date: Oct. 5, 2023

(65) Prior Publication Data

US 2025/0198795 A1 Jun. 19, 2025

(30) Foreign Application Priority Data

Mar. 30, 2022 (JP) ................................ 2022-057341

(51) Int. Cl.
*G01C 21/00* (2006.01)
*G01S 17/89* (2020.01)
(Continued)

(52) U.S. Cl.
CPC ......... *G01C 21/3848* (2020.08); *G05D 1/245* (2024.01); *G05D 1/2462* (2024.01)

(58) Field of Classification Search
CPC .. G01C 21/3848; G05D 1/245; G05D 1/2462; G05D 2107/60; G05D 2111/17; G05D 1/242; G05D 1/2464; G01S 17/89
(Continued)

(56) References Cited

U.S. PATENT DOCUMENTS

2018/0079085 A1* 3/2018 Nakata .................. B25J 13/089
2018/0292822 A1* 10/2018 Ichikawa ............ G05D 1/0257
(Continued)

FOREIGN PATENT DOCUMENTS

JP 2012141662 A * 7/2012
JP 2012248032 A * 12/2012
(Continued)

OTHER PUBLICATIONS

International Search Report and Written Opinion of PCT Application No. PCT/JP2023/010571, issued on May 9, 2023, 09 pages of ISRWO.

*Primary Examiner* — Hossam M Abd El Latif
(74) *Attorney, Agent, or Firm* — CHIP LAW GROUP

(57) ABSTRACT

An information processing device includes an acquisition unit that acquires first map information concerning a first map corresponding to a moving environment of a mobile body, the first map being generated in advance, and sensor information of the mobile body at positions in the moving environment and a generation unit that generates second map information concerning a second map indicating a score change rate indicating a matching degree between the first map information and the sensor information, the change rate being the score change rate at the positions in the moving environment.

12 Claims, 7 Drawing Sheets

(51) Int. Cl.

| | |
|---|---|
| ***G05D 1/242*** | (2024.01) |
| ***G05D 1/245*** | (2024.01) |
| ***G05D 1/246*** | (2024.01) |
| ***G05D 107/60*** | (2024.01) |
| ***G05D 111/10*** | (2024.01) |

(58) Field of Classification Search

USPC .............................................................. 701/24

See application file for complete search history.

(56) References Cited

U.S. PATENT DOCUMENTS

| | | | | |
|---|---|---|---|---|
| 2019/0064830 | A1* | 2/2019 | Funayama | G05D 1/0274 |
| 2019/0137274 | A1* | 5/2019 | Sabe | G01S 19/47 |
| 2021/0365701 | A1* | 11/2021 | Eshet | G06V 20/588 |

FOREIGN PATENT DOCUMENTS

| | | | |
|---|---|---|---|
| JP | 2017-045447 | A | 3/2017 |
| JP | 2022-012173 | A | 1/2022 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2023/010571 filed on Mar. 17, 2023, which claims priority benefit of Japanese Patent Application No. JP 2022-057341 filed in the Japan Patent Office on Mar. 30, 2022. Each of the above-referenced applications is hereby incorporated herein by reference in its entirety.

FIELD

The present invention relates to an information processing device, an information processing method, and an information processing program.

BACKGROUND

In recent years, autonomous mobile bodies equipped with artificial intelligence, such as robot vacuum cleaners and pet robots in homes and transport robots in factories and distribution warehouses, have been actively developed.

In an autonomous mobile body, it is important to accurately estimate the current position and posture (hereinafter referred to as self-position) of the autonomous mobile body not only in reliably reaching a destination but also in safely acting according to a surrounding environment.

For example, for the purpose of preventing a robot from falling into a situation in which estimation accuracy of a self-position of the robot is poor, a technique of calculating a self-position estimation easiness parameter based on complexity of a shape of an obstacle is known.

CITATION LIST

Patent Literature

Patent Literature 1: JP 2012-141662 A

SUMMARY

Technical Problem

However, in the related art explained above, the self-position estimation easiness parameter is merely calculated based on the complexity of the shape of the obstacle. The related art cannot always make it possible to improve the estimation accuracy of the self-position of the mobile body.

Therefore, the present disclosure proposes an information processing device, an information processing method, and an information processing program that can make it possible to improve estimation accuracy of a self-position of a mobile body.

Solution to Problem

To solve the above problem, an information processing device includes an acquisition unit that acquires first map information concerning a first map corresponding to a moving environment of a mobile body, the first map being generated in advance, and sensor information of the mobile body at positions in the moving environment and a generation unit that generates second map information concerning a second map indicating a score change rate indicating a matching degree between the first map information and the sensor information, the change rate being the score change rate at the positions in the moving environment.

DESCRIPTION OF EMBODIMENTS

Figure 1:
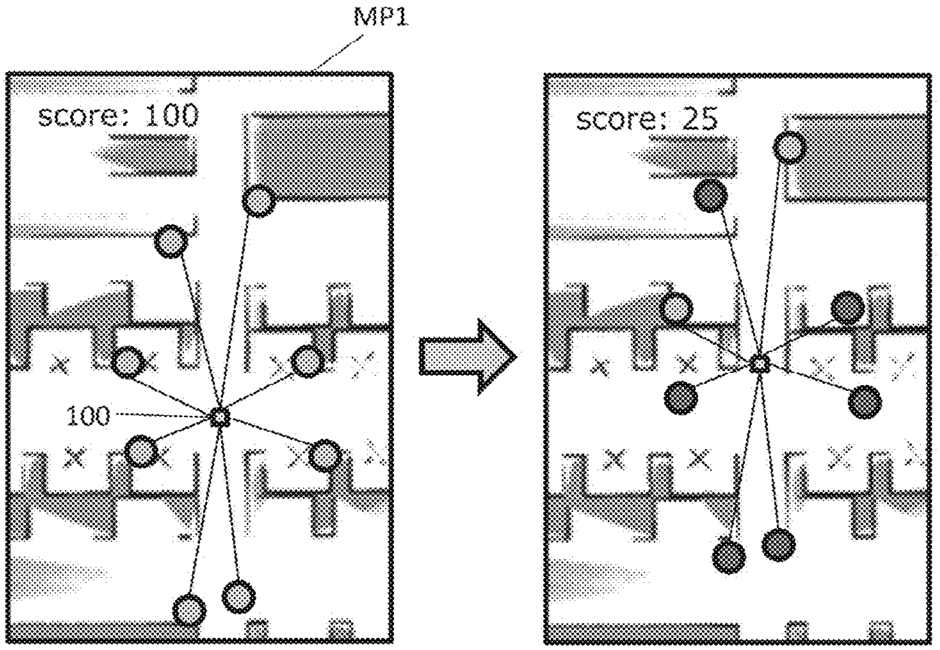
FIG. 1 is a diagram for explaining an environment in which a score change rate is large according to an embodiment of the present disclosure.

An embodiment of the present disclosure is explained in detail below with reference to the drawings. Note that, in the embodiment explained below, redundant explanation is omitted by denoting the same parts with the same reference numerals and signs.

EMBODIMENT

1. Introduction

There has been known a technique of estimating a self-position of a mobile body by comparing (matching) a wide region map (hereinafter referred to as pre-map) prepared in advance and sensor information acquired in real time by a sensor of the mobile body to specify a part where the map and the sensor information match. Note that the pre-map is, for example, information in which the shape of an environment such as an obstacle present in a certain region is recorded as a two-dimensional map or a three-dimensional map.

In general, estimation accuracy of the self-position of the mobile body varies depending on a surrounding environment of the mobile body. The estimation accuracy of the self-position of the mobile body has been often determined by causing the mobile body to actually travel in the environment or by an empirical rule of a user of the mobile body.

Therefore, there has been known a technique of calculating a score (also referred to as matching score) indicating a matching degree between the pre-map and the sensor information acquired by the sensor of the mobile body as an indicator for achieving the reliability of the estimation result of the self-position of the mobile body. However, the matching score changes depending on the surrounding environment of the mobile body. It cannot be said that a correlation with the estimation accuracy of the self-position of the mobile body is high.

For example, for the purpose of preventing a situation in which estimation accuracy of a self-position of a mobile body is poor, there has been known a technique for calculating a self-position estimation easiness parameter (an example of the matching score) based on complexity of a shape of an obstacle. However, high complexity of an environment does not always lead to improvement in the estimation accuracy of the self-position. For example, in an environment in which there are repeated patterns by pillars or the like, although a feature value indicating features of the environment is large, erroneous matching easily occurs. On the other hand, in an environment surrounded by walls on four sides, it is easy to obtain a highly accurate estimation result regardless of the fact that a feature value indicating features of the environment is small.

In contrast, the information processing device according to the embodiment of the present disclosure generates a score gradient map that is a score change rate (an example of a matching score) indicating a matching degree between pre-map corresponding to a moving environment of a mobile body and sensor information of the mobile body at positions in the moving environment, the change rate being a change rate of scores at the positions in the moving environment. It can be said that the score change rate is a parameter indicating easiness (difficulty) of estimation of a self-position due to the moving environment at the time when a mobile body 100 estimates a self-position based on the sensor information. Note that, in the present embodiment, a case in which the pre-map is a two-dimensional occupancy grid map is explained.

FIG. 1 is a diagram for explaining an environment in which a score change rate is large according to the embodiment of the present disclosure. FIG. 1 illustrates, with raycast, how sensor information of a mobile body is seen in grids of a pre-map MP1. FIG. 1 illustrates an environment in which there are repeated patterns by pillars and a feature value indicating features of the environment is large. The left side of FIG. 1 illustrates a state in which a score in the case in which the mobile body 100 is located in a predetermined grid of the pre-map MP1 is 100. On the other hand, the right side of FIG. 1 illustrates a state in which the score decreases from 100 to 25 when the mobile body 100 is moved to a grid adjacent to the predetermined grid of the pre-map MP1. As illustrated in FIG. 1, the environment in which the score change rate is large is considered to be an environment in which the mobile body 100 can easily estimate a self-position because the feature value indicating the features of the environment is large. That is, a place where the score change rate is large is considered to be a place where estimation accuracy of the self-position is high.

Figure 2:
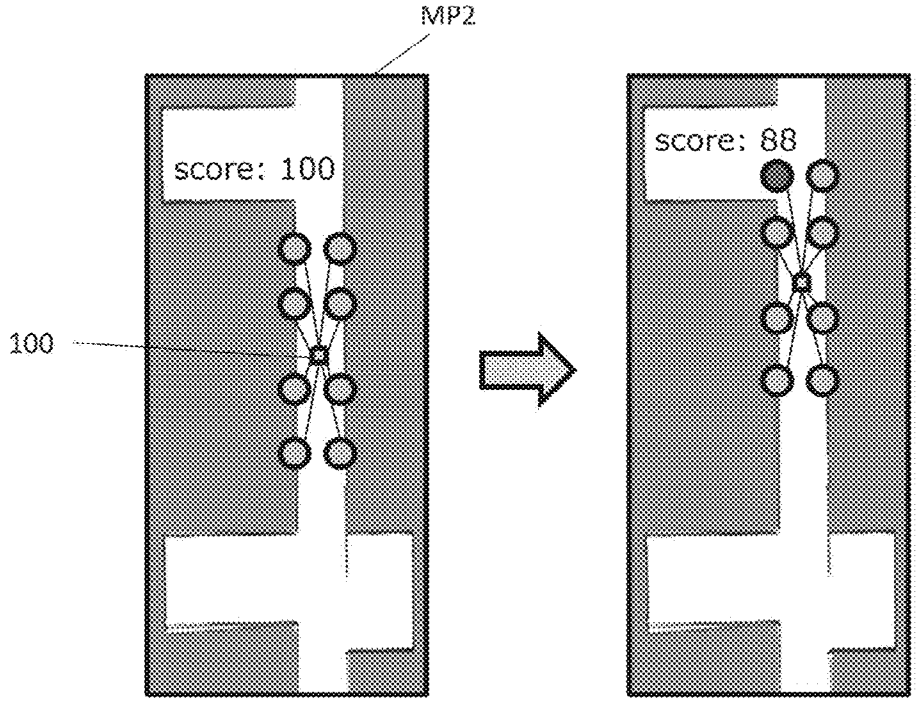
FIG. 2 is a diagram for explaining an environment in which a score change rate is small according to the embodiment.

FIG. 2 is a diagram for explaining an environment in which a score change rate is small according to the embodiment of the present disclosure. Like FIG. 1, FIG. 2 illustrates, with the raycast, how the sensor information of the mobile body is seen in the grids of the pre-map. FIG. 2 is different from FIG. 1 in illustrating an environment that is surrounded by walls of a long corridor and in which a feature value indicating features of the environment is small. The left side of FIG. 2 illustrates a state in which a score in the case in which the mobile body 100 is located in a predetermined grid of a pre-map MP2 is 100. On the other hand, the right side of FIG. 2 illustrates a state in which the score decreases from 100 to 88 when the mobile body 100 is moved to a grid adjacent to the predetermined grid of the pre-map MP2. As illustrated in FIG. 2, the environment in which the score change rate is small is considered to be an environment in which the mobile body 100 less easily estimates a self-position because the feature value indicating the features of the environment is small. That is, a place where the score change rate is small is considered to be a place where estimation accuracy of the self-position is low.

Therefore, as explained above, the information processing device according to the embodiment of the present disclosure generates the score gradient map indicating the score change rate indicating the matching degree between the pre-map corresponding to the moving environment of the mobile body and the sensor information of the mobile body at the positions in the moving environment, the change rate being the score change rate at the positions in the moving environment. Accordingly, the information processing device can visualize a place where the score change rate is high or a place where the score change rate is low in the moving environment of the mobile body. Therefore, the information processing device can visualize a level of estimation accuracy of the self-position of the mobile body in the moving environment of the mobile body.

2. Configuration of the Mobile Body Device

In the following explanation, a case in which the information processing device according to the embodiment of the present disclosure is a mobile body device 100 is explained. Note that, in the following explanation, the mobile body device 100 is sometimes described as mobile body 100.

Figure 3:
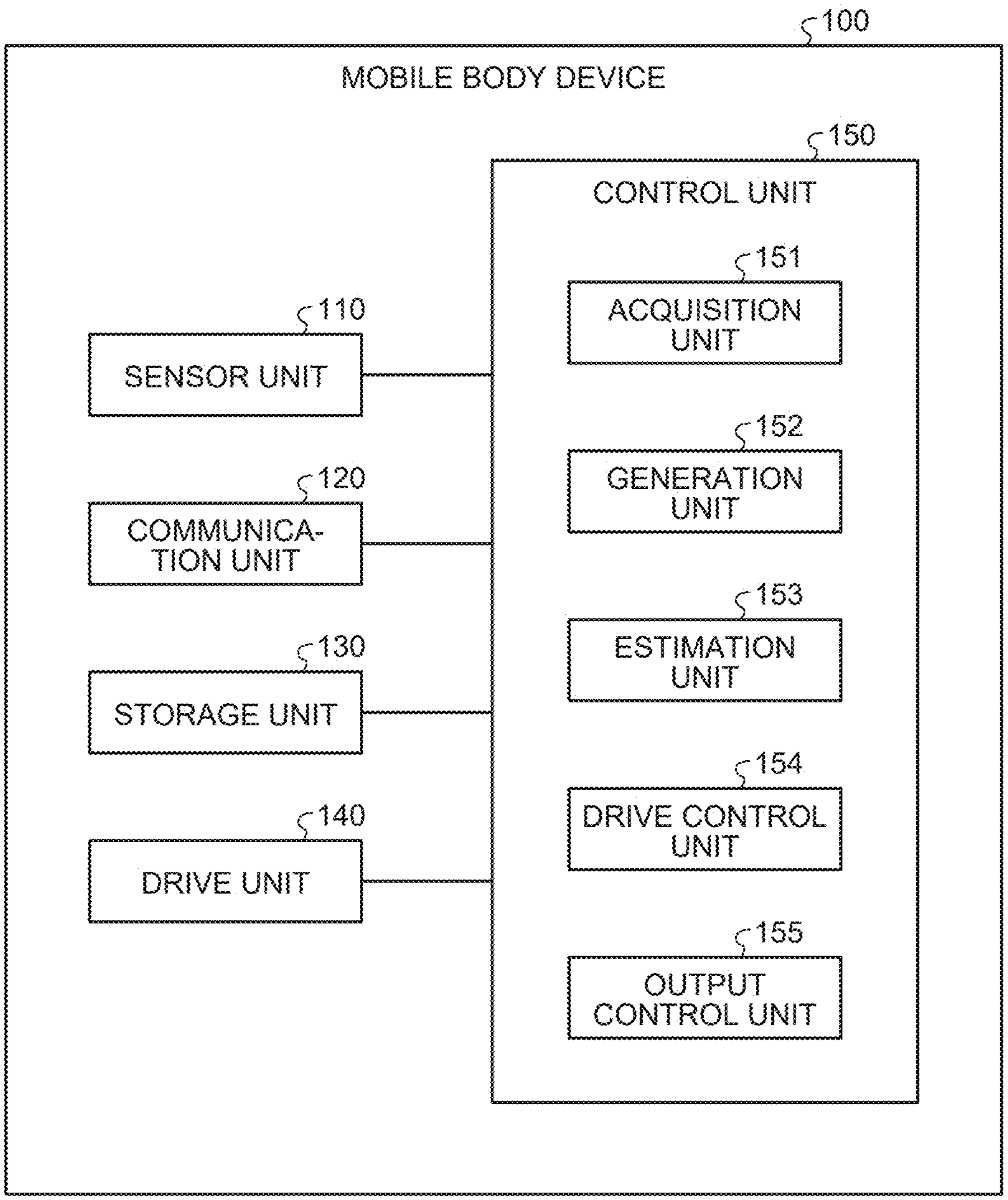
FIG. 3 is a diagram illustrating a configuration example of a mobile body device according to the embodiment.

FIG. 3 is a diagram illustrating a configuration example of the mobile body device 100 according to the embodiment of the present disclosure. As illustrated in FIG. 3, the mobile body device 100 includes a sensor unit 110, a communication unit 120, a storage unit 130, a drive unit 140, and a control unit 150.

The sensor unit 110 can include various sensor devices. For example, the sensor unit 110 can include an external sensor and an internal sensor. The sensor unit 110 performs sensing using the sensors. Then, the sensor unit 110 outputs sensing information acquired by the various sensors by the sensing to the control unit 150.

The sensor unit 110 uses the external sensor and the internal sensor to acquire information used by the control unit 150 to estimate a self-position of the mobile body device 100. The external sensor is a sensor that acquires information such as the shape of an object present around the mobile body 100 and a distance and the direction to the object present around the mobile body 100. For example, the external sensor includes a LiDAR (Laser Imaging Detection and Ranging), a Sonar, a camera, and a ToF (Time Of Flight) sensor. The internal sensor is a sensor for acquiring information such as a moving distance, moving speed, a moving direction, and a posture of the mobile body device 100. For example, the internal sensor includes an inertial measurement unit (IMU) for detecting a direction and acceleration of movement of the mobile body 100 and an encoder (or a potentiometer) that detects a drive amount of an actuator. Note that, besides the above, an acceleration sensor, an angular velocity sensor, and the like can be used as the internal sensor.

Figure 4:
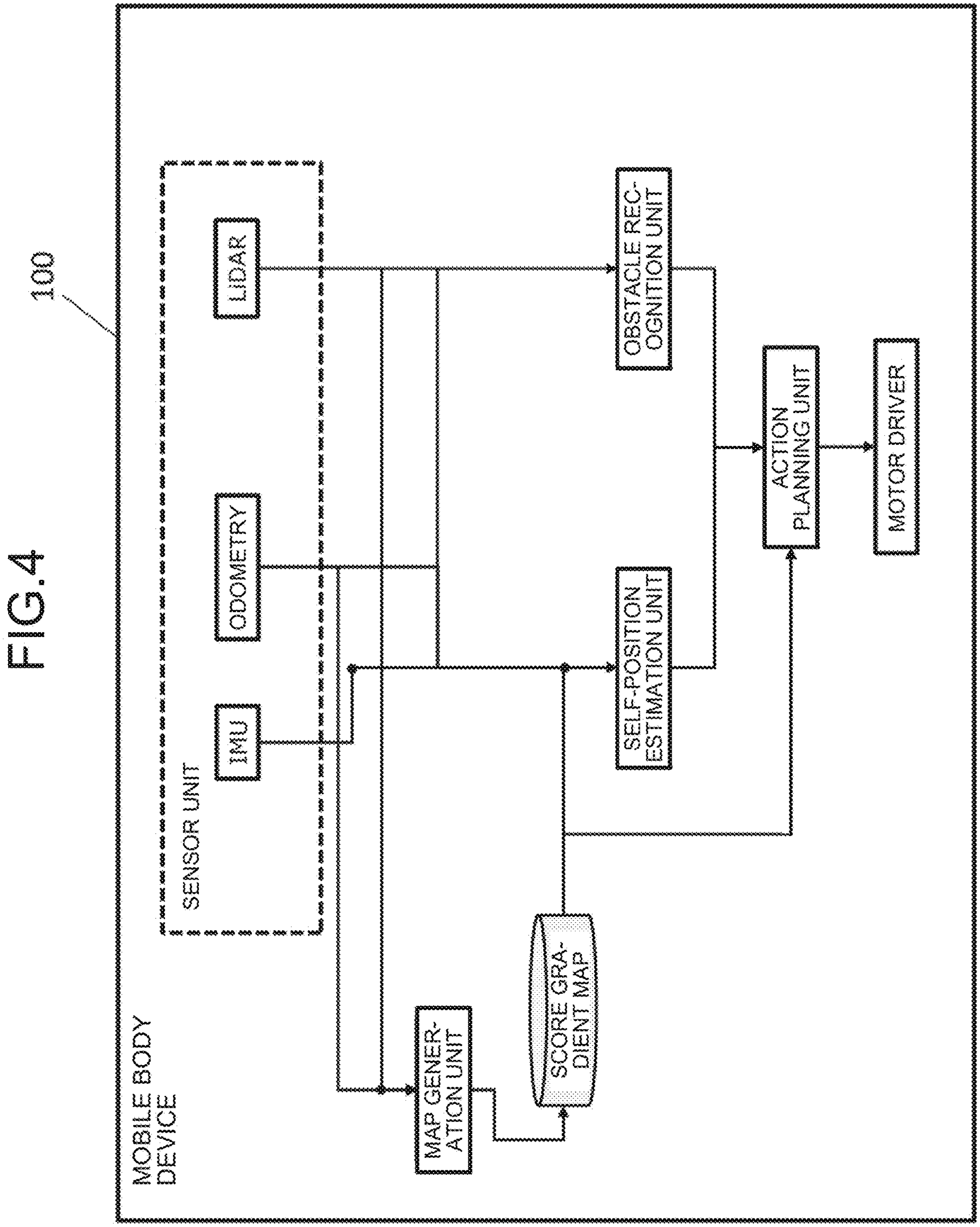
FIG. 4 is a diagram for explaining functions of the mobile body device according to the embodiment.

FIG. 4 is a diagram for explaining functions of the mobile body device according to the embodiment of the present disclosure. In the example illustrated in FIG. 4, the sensor unit 110 includes a LiDAR as the external sensor. The LiDAR of the sensor unit 110 detects, as sensor information, distance information (depth information) of an object located in an environment around the mobile body 100. The sensor unit 110 includes an IMU and an odometry sensor as the internal sensor. The IMU and the odometry sensor of the sensor unit 110 detect information such as a moving distance, moving speed, a moving direction, and a posture of the mobile body device 100 as the sensor information.

The sensor unit 110 outputs sensor information acquired by the external sensor with sensing to the control unit 150. The sensor unit 110 outputs sensor information acquired by the internal sensor with sensing to the control unit 150.

The communication unit 120 is implemented by, for example, an NIC (Network Interface Card). The communication unit 120 may be connected to a network by wire or radio and, for example, transmit and receive information to and from a terminal device used by the user.

The storage unit 130 is realized by, for example, a semiconductor memory element such as a RAM (Random Access Memory) or a flash memory or a storage device such as a hard disk or an optical disk. For example, the storage unit 130 stores information concerning a pre-map acquired by an acquisition unit 151. The storage unit 130 stores information concerning a score gradient map generated by a generation unit 152.

The drive unit 140 has a function of driving physical components in the mobile body device 100. The drive unit 140 has a function of moving the position of the mobile body device 100. Specifically, the drive unit 140 controls the movement of the position of the mobile body device 100 according to control of a drive control unit 154. More specifically, the drive unit 140 controls the movement of the position of the mobile body device 100 according to control information received from the drive control unit 154. The drive unit 140 is, for example, an actuator. In the example illustrated in FIG. 4, the drive unit 140 is a motor driver. Note that the drive unit 140 may have any configuration if the mobile body device 100 can realize a desired operation. The drive unit 140 may have any configuration if it is possible to realize, for example, the movement of the position of the mobile body device 100. For example, the drive unit 140 drives a moving mechanism of the mobile body device 100 according to an instruction by the drive control unit 154 to thereby move the mobile body device 100 and change the position of the mobile body device 100.

The control unit 150 is a controller and is implemented, for example, by various programs (equivalent to an example of an information processing program) stored in a storage device on the inside of the mobile body device 100 being executed by a CPU (Central Processing Unit), an MPU (Micro Processing Unit), an ASIC (Application Specific Integrated Circuit), an FPGA (Field Programmable Gate Array), or the like using a storage region of a RAM or the like as a work region. In the example illustrated in FIG. 3, the control unit 150 includes the acquisition unit 151, the generation unit 152, an estimation unit 153, the drive control unit 154, and an output control unit 155.

The acquisition unit 151 acquires various kinds of information. Specifically, the acquisition unit 151 acquires sensor information from the sensor unit 110. More specifically, the acquisition unit 151 acquires sensor information from the external sensor of the sensor unit 110. For example, the acquisition unit 151 acquires, from the external sensor of the sensor unit 110, as the sensor information, information such as the shape of an object present around the mobile body 100 and the distance and the direction to the object present around the mobile body 100. For example, the acquisition unit 151 acquires, from the LiDAR of the sensor unit 110, as the sensor information, distance information of an object located in an environment around the mobile body 100.

The acquisition unit 151 acquires sensor information from the internal sensor of the sensor unit 110. For example, the acquisition unit 151 acquires, from the internal sensor of the sensor unit 110, as the sensor information, information such as a moving distance, moving speed, a moving direction, and a posture of the mobile body device 100.

The acquisition unit 151 acquires first map information concerning a pre-map corresponding to a moving environment of the mobile body 100, the pre-map being generated in advance. Specifically, the acquisition unit 151 generates the first map information concerning the pre-map based on the sensor information. More specifically, the acquisition unit 151 generates, as the pre-map, the first map information concerning an occupancy grid map corresponding to the moving environment of the mobile body 100. The occupancy grid map is a map that divides a three-dimensional or two-dimensional space around the mobile body 100 into grids (grids) of a predetermined size and indicates an occupancy state of an object in units of grids. The occupancy state of the object is indicated by, for example, presence or absence and a presence probability of the object. The acquisition unit 151 generates, as the pre-map, the first map information concerning a high-precision map corresponding to the moving environment of the mobile body 100. The high-precision map is, for example, a point cloud map configured by point cloud (point cloud data). Note that the acquisition unit 151 may acquire the first map information concerning the pre-map from an external server device instead of generating the pre-map.

The acquisition unit 151 acquires sensor information of the mobile body 100 at positions in the moving environment. Specifically, the acquisition unit 151 acquires sensor information at positions in a movable region, which is a region where movement by the mobile body 100 is possible, in the moving environment. For example, the acquisition unit 151 acquires sensor information at positions on the pre-map corresponding to the moving environment. For example, when the pre-map is the occupancy grid map, the acquisition unit 151 may acquire sensor information in grids.

The generation unit 152 is equivalent to a map creation unit illustrated in FIG. 4. Specifically, the generation unit 152 calculates a score indicating a matching degree between the pre-map and the sensor information, the score being a score at positions in the moving environment. For example, the generation unit 152 acquires the pre-map acquired by the acquisition unit 151. Subsequently, the generation unit 152 virtually disposes the mobile body 100 at positions on the pre-map by simulation. The generation unit 152 acquires sensor information of the mobile body 100 at the positions where the mobile body 100 is virtually disposed. For example, the generation unit 152 causes the LiDAR of the sensor unit 110 of the mobile body 100 at the positions where the mobile body 100 is virtually disposed to virtually emit radio waves and virtually receives reflected waves of the radio waves. Subsequently, the generation unit 152 acquires, as the sensor information, distance information of a surrounding environment based on the reflection of the virtual radio waves. Note that the generation unit 152 may cause the mobile body 100 to actually travel in the moving environment corresponding to the pre-map and acquire sensor information of the mobile body 100 caused to actually travel.

Subsequently, the generation unit 152 calculates a score indicating a matching degree between the pre-map and the sensor information. For example, the generation unit 152 calculates a score indicating a matching degree between a feature value indicating features of an environment indicated by sensor information of the mobile body 100 at positions on the pre-map and a feature value indicating features of an environment indicated by the pre-map. Note that the generation unit 152 may generate partial maps at positions in the moving environment based on the sensor information of the mobile body 100 at the positions on the pre-map. Then, the generation unit 152 may calculate a score indicating a matching degree between the generated partial maps and the pre-map.

Figure 5:
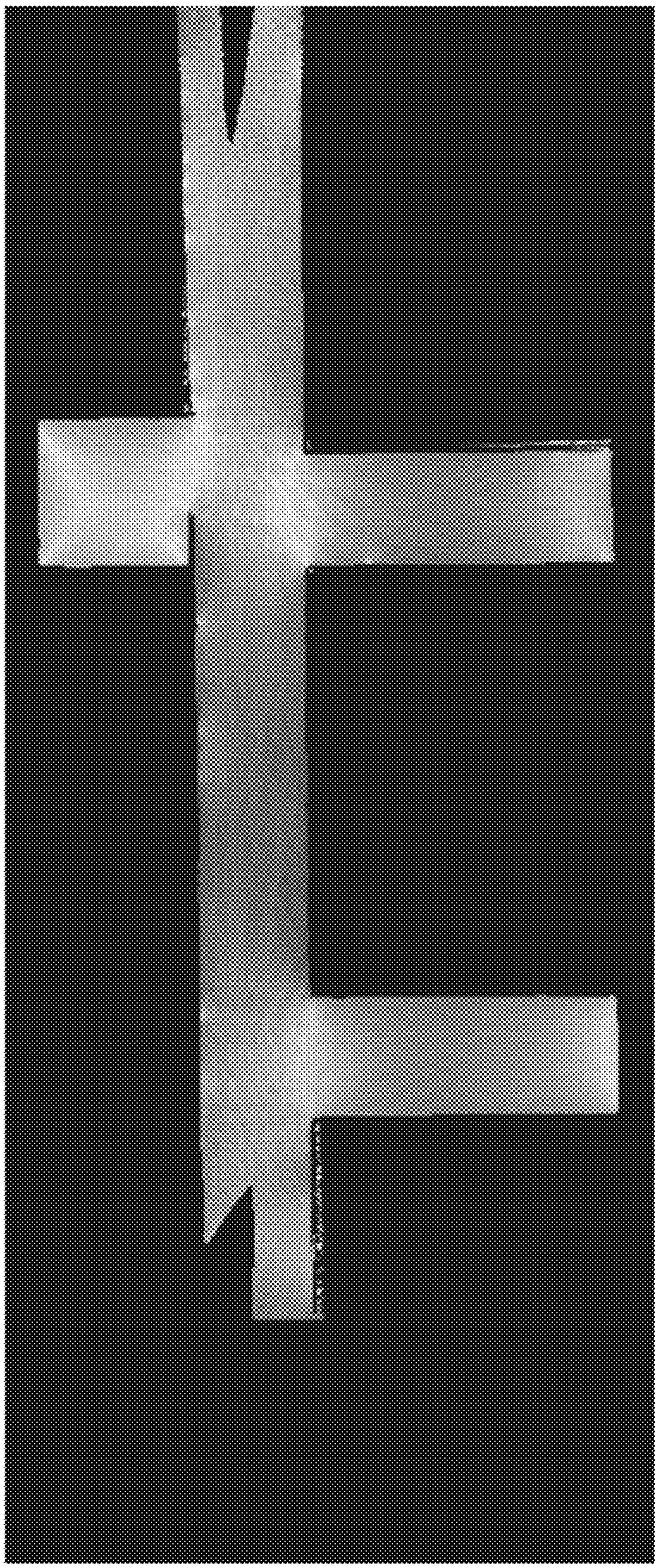
FIG. 5 is a diagram illustrating an example of a score gradient map according to the embodiment.

Subsequently, the generation unit 152 generates second map information concerning a score gradient map indicating a change rate of score indicating a matching degree between the first map information and the sensor information, the change rate being a change rate of scores at the positions in the moving environment. Specifically, the generation unit 152 generates the second map information concerning a score gradient map indicating a change rate of scores at positions in a movable region in the moving environment. For example, when the scores at the positions in the moving environment are calculated, the generation unit 152 calculates a score change rate at the positions in the moving environment by differentiating the calculated scores at the positions with the positions. Subsequently, the generation unit 152 generates a score gradient map in which the score change rate at the positions calculated on the pre-map is superimposed and displayed. FIG. 5 is a diagram illustrating an example of a score gradient map according to the embodiment. In FIG. 5, a score change rate on the score gradient map is represented by a scalar quantity. FIG. 5 indicates that, in a place where a color is brighter (darker), the score change rate is larger (smaller). Note that the score change rate may be a scalar quantity or a vector quantity. For example, the score change rate may be a two-dimensional vector quantity differentiated for each of two-dimensional coordinates (x, y) indicating positions on the pre-map.

The generation unit 152 changes, according to the score change rate, the size of a prohibited region, which is a region where movement by the mobile body 100 is prohibited, in the moving environment. The prohibited region may be a region set around an obstacle such that the mobile body 100 does not come into contact with the obstacle. For example, the generation unit 152 may set, based on the score gradient map, the size of the prohibited region corresponding to a position where the score change rate is a predetermined threshold or larger than the size of the prohibited region corresponding to a position where the score change rate is smaller than the predetermined threshold.

The generation unit 152 generates a moving route of the mobile body 100 at the time when the mobile body 100 moves from a departure place to a destination. Specifically, the generation unit 152 forms a route plan (also referred to as action plan) of the mobile body 100 at the time when the mobile body 100 moves from the departure place to the destination and generates a moving route based on the route plan. More specifically, the generation unit 152 generates, based on the score change rate, a moving route of the mobile body 100 passing a position where the score change rate exceeds a first threshold in the moving environment. For example, the generation unit 152 detects, based on the score gradient map, a position where the score change rate exceeds the first threshold. Subsequently, the generation unit 152 generates, as a moving route of the mobile body 100 moving from the departure place to the destination on the score gradient map, a moving route passing more positions where the score change rate exceeds the first threshold.

Here, easiness of convergence of a self-position estimated by the mobile body 100 changes according to easiness of convergence of a self-position of the mobile body 100 estimated at one-step earlier time. Therefore, the generation unit 152 generates a moving route of the mobile body based on a history of the score change rate in a moving time in which the mobile body moves from the departure place to the destination. For example, the generation unit 152 generates a moving route of the mobile body 100 based on a history (time series data) of a change rate of scores at positions in the moving route.

The easiness of the convergence of the self-position estimated by the mobile body 100 changes according to the moving direction of the mobile body 100. Therefore, the generation unit 152 generates, based on the score gradient map, according to a score change rate at the current position of the mobile body 100, a moving route of the mobile body 100 on which the mobile body 100 moves in a direction in which the score change rate is easily increased.

The estimation unit 153 is equivalent to a self-position estimation unit and an obstacle recognition unit illustrated in FIG. 4. The estimation unit 153 estimates a self-position of the mobile body 100. Specifically, the estimation unit 153 estimates the self-position based on the sensor information and the pre-map acquired by the acquisition unit 151. For example, the estimation unit 153 estimates the self-position based on the same kind of sensor information as the sensor information used for generating the score gradient map. For example, when the generation unit 152 has generated the score gradient map based on sensor information of the LiDAR, the estimation unit 153 estimates the self-position based on the sensor information of the LiDAR.

The drive control unit 154 is equivalent to an action planning unit illustrated in FIG. 4. The drive control unit 154 controls movement of the position of the mobile body 100. Specifically, the drive control unit 154 generates control information for moving the position of the mobile body 100 along the moving route generated by the generation unit 152. Subsequently, the drive control unit 154 outputs the generated control information to the drive unit 140. Here, the easiness of the convergence of the self-position estimated by the mobile body 100 changes according to the moving direction of the mobile body 100. Therefore, the drive control unit 154 controls, according to the score change rate at the current position of the mobile body 100, the movement of the position of the mobile body 100 such that the mobile body 100 moves in a direction in which the score change rate is easily increased.

The output control unit 155 outputs various kinds of information to the terminal device of the user. Specifically, the output control unit 155 transmits the first map information concerning the pre-map acquired by the acquisition unit 151 to the terminal device of the user. When receiving the first map information, the terminal device of the user displays the pre-map on a screen of the terminal device. In addition, the output control unit 155 transmits the second map information concerning the score gradient map generated by the generation unit 152 to the terminal device of the user. When receiving the second map information, the terminal device of the user displays the score gradient map on the screen of the terminal device. The output control unit 155 transmits the information concerning the moving route generated by the generation unit 152 to the terminal device of the user. For example, the generation unit 152 generates third map information concerning a third map obtained by superimposing and displaying the moving route on the pre-map or the score gradient map. The output control unit 155 transmits the third map information generated by the generation unit 152 to the terminal device of the user. When receiving the third map information, the terminal device of the user displays the third map on the screen of the terminal device.

In addition, the output control unit 155 outputs, based on the score change rate, to the terminal device, information concerning a position where the score change rate is the second threshold or smaller in the moving environment. For example, the generation unit 152 generates fourth map information concerning a score gradient map that visually emphasizes and displays a position where the score change rate is the second threshold or smaller in the score gradient map. The output control unit 155 transmits the fourth map information generated by the generation unit 152 to the terminal device of the user.

The output control unit 155 outputs a notification for urging the user to change the moving environment to the terminal device of the user. For example, when transmitting the fourth map information, the output control unit 155 also transmits a notification for urging the user to dispose a characteristic object at a position where the score change rate is the second threshold or smaller. The output control unit 155 transmits, to the terminal device of the user, candidates for a place where the characteristic object should be disposed and information indicating the score change rate or a degree of improvement in the score change rate in the case in which the characteristic object is disposed in the place. The output control unit 155 may transmit, for each of candidates of a plurality of places where the characteristic object should be disposed, the information indicating the score change rate or the degree of improvement in the score change rate to the terminal device of the user.

3. Information Processing Procedure

Figure 6:
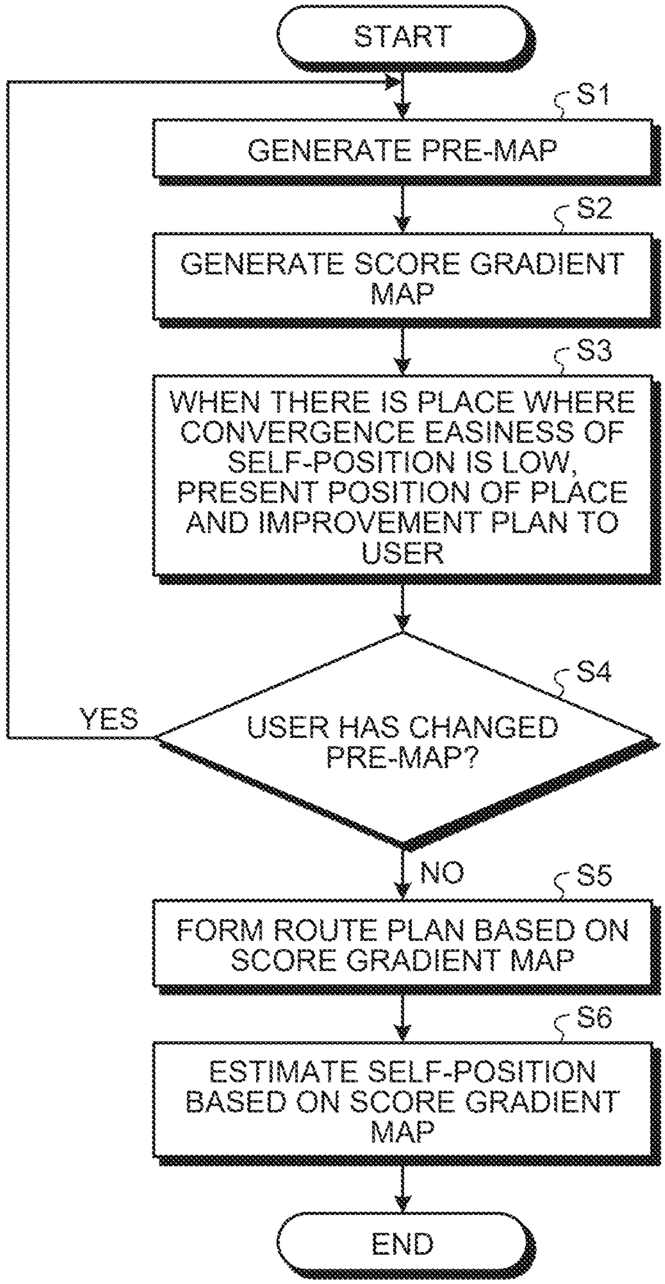
FIG. 6 is a flowchart illustrating an information processing procedure according to the embodiment.

FIG. 6 is a flowchart illustrating an information processing procedure according to the embodiment of the present disclosure. The acquisition unit 151 of the mobile body device 100 generates a pre-map (Step S1). The generation unit 152 of the mobile body device 100 generates a score gradient map (Step S2). When there is a place where convergence easiness of the self-position is low (for example, a place where the score change rate is the second threshold or smaller), the output control unit 155 of the mobile body device 100 outputs the position of the place and an improvement plan to the terminal device of the user (Step S3). The acquisition unit 151 of the mobile body device 100 determines whether the user has changed the pre-map (Step S4). When determining that the user has changed the pre-map (Step S4; Yes), the acquisition unit 151 generates a new pre-map (Step S1). On the other hand, when the acquisition unit 151 determines that the user has not changed the pre-map (Step S4; No), the generation unit 152 forms a route plan based on the score gradient map and generates a moving route (Step S5). The estimation unit 153 of the mobile body device 100 estimates a self-position based on the same kind of sensor information as the sensor information used for generating the score gradient map (Step S6).

4. Modifications

The mobile body device 100 according to the embodiment explained above may be implemented in various different modes other than the embodiment explained above. Therefore, in the following explanation, other embodiments of the mobile body device 100 are explained. Note that the same portions as the portions in the embodiment are denoted by the same reference numerals and signs, and explanation of the portions is omitted.

4-1. First Modification

Figure 7:
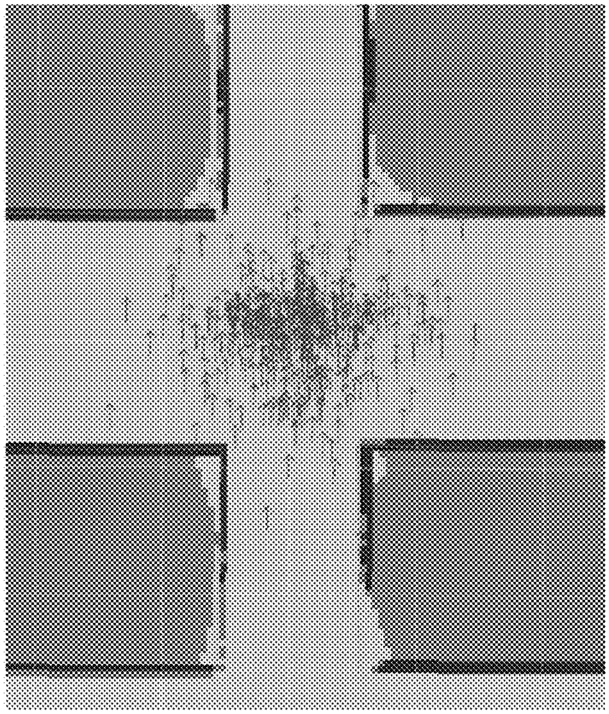
FIG. 7 is a diagram illustrating an example of a score gradient map according to a first modification of the same embodiment.

In the embodiment explained above, the case in which the generation unit 152 calculates, as the score indicating the convergence easiness of the self-position of the mobile body 100, the score change rate indicating the matching degree between the pre-map and the sensor information is explained. However, the score indicating the convergence easiness of the self-position of the mobile body 100 is not limited to this case. In a first modification, the generation unit 152 calculates, as the score indicating the convergence easiness of the self-position of the mobile body 100, a change rate of a variance-covariance matrix after resampling by Monte Carlo localization. FIG. 7 is a diagram illustrating an example of a score gradient map according to the first modification of the embodiment of the present disclosure. In FIG. 7, the generation unit 152 generates, as a score indicating convergence easiness of the self-position of the mobile body 100, raycast scan from the mobile body 100 in grids with respect to the pre-map and calculates a change rate of a plurality of times of resampling results on the spot at the time when the raycast scanning is input.

In addition, the generation unit 152 calculates, based on sensor information of the mobile body 100 at positions, the number of feature points indicating features of an environment present around the mobile body 100 at the positions. Subsequently, the generation unit 152 may calculate a change rate of the number of feature points at the positions as the score indicating the convergence easiness of the self-position of the mobile body 100.

4-2. Second Modification

In the embodiment explained above, the case in which the generation unit 152 generates one kind of the score gradient map based on one kind of the sensor information such as the sensor information the LiDAR is explained. In a second modification, the generation unit 152 respectively generates a plurality of score gradient maps based on sensor information of each of a plurality of sensors. Specifically, the acquisition unit 151 respectively acquires sensor information of each of a plurality of sensors of a mobile body. Subsequently, the acquisition unit 151 respectively generates a plurality of pre-maps based on the sensor information of each of the plurality of sensors of the mobile body. The generation unit 152 respectively generates a plurality of score gradient maps based on the sensor information of each of the plurality of sensors. For example, the generation unit 152 generates a first score gradient map indicating a change rate of a first score indicating a matching degree between the pre-maps and the sensor information of the LiDAR, the change rate being a change rate of the first score at positions in a moving environment. The generation unit 152 generates a second score gradient map indicating a change rate of a second score indicating a matching degree between the pre-maps and sensor information of a camera, the change rate being a change rate of the second score at the positions in the moving environment.

Subsequently, the estimation unit 153 determines weights of the sensors based on a change rate of scores indicating matching degrees between the pre-maps and the pieces of sensor information. For example, the estimation unit 153 calculates, based on the first score gradient map, a first ratio that is a ratio of an area occupied by a position where the change rate of the first score exceeds a predetermined threshold to an area of a movable region in the first score gradient map. The estimation unit 153 calculates, based on the second score gradient map, a second ratio that is a ratio of an area occupied by a position where the change rate of the second score exceeds the predetermined threshold to an area of a movable region in the second score gradient map. Subsequently, the estimation unit 153 determines weight of the LiDAR and weight of the camera based on the first ratio and the second ratio. For example, when a ratio of the first ratio and the second ratio is "6:4", the estimation unit 153 determines a ratio of the weight of the LiDAR and the weight of the camera as "6:4". Subsequently, the estimation unit 153 estimates the self-position based on each piece of sensor information corresponding to the determined weight of each sensor. For example, when the ratio of the weight of the LiDAR and the weight of the camera is determined as "6:4", the estimation unit 153 calculates a self-position by adding up a first self-position estimated based on the sensor information of the LiDAR and a second self-position estimated based on the sensor information of the camera respectively at the ratio of "6:4".

4-3. Third Modification

The output control unit 155 outputs, based on the score change rate, to the terminal device of the user, information indicating whether stop accuracy of the mobile body 100 at the positions in the moving environment can be set. For example, the generation unit 152 generates relation information in which the stop accuracy of the mobile body 100 at the positions in the moving environment and the score change rate are associated. The output control unit 155 refers to the relation information generated by the generation unit 152 and specifies information concerning the stop accuracy of the mobile body 100 corresponding to the score change rate. Subsequently, the output control unit 155 outputs, based on the specified information concerning the stop accuracy, to the terminal device, information indicating whether the stop accuracy of the mobile body 100 can be set and information concerning a set numerical value of the stop accuracy.

5. Effects

As explained above, the information processing device according to the embodiment or the modifications of the present disclosure (the mobile body device 100 in the embodiment) includes the acquisition unit (the acquisition unit 151 in the embodiment) and the generation unit (the generation unit 152 in the embodiment). The acquisition unit acquires first map information concerning a first map corresponding to a moving environment of a mobile body, the first map being generated in advance, and sensor information of the mobile body at positions in the moving environment. The generation unit generates second map information concerning a second map indicating a score change rate indicating a matching degree between the first map information and the sensor information, the change rate being a change rate of scores at the positions in the moving environment.

Accordingly, the information processing device can visualize a place where the score change rate is high or a place where the score change rate is low in the moving environment of the mobile body. That is, the information processing device can visualize a level of estimation accuracy of a self-position of the mobile body in the moving environment of the mobile body. Therefore, for example, when there is a place where the estimation accuracy of the self-position of the mobile body is low, the information processing device can urge the user to correct the moving environment of the mobile body. The information processing device can generate a moving route to pass through a place where the estimation accuracy of the self-position of the mobile body is high. Therefore, the information processing device can make it possible to improve the estimation accuracy of the self-position of the mobile body.

In addition, the acquisition unit acquires sensor information at positions in a movable region, which is a region where movement by the mobile body is possible, in the moving environment. The generation unit generates second map information concerning a second map indicating a score change rate at the positions in the movable region in the moving environment.

Accordingly, the information processing device can visualize a place where the score change rate is high or a place where the score change rate is low in the movable region of the mobile body.

The generation unit changes, according to the score change rate, the size of a prohibited region, which is a region where movement by the mobile body is prohibited, in the moving environment.

Accordingly, the information processing device can set, according to the score change rate, for example, the size of the prohibited region larger (smaller) in a place where the estimation accuracy of the self-position of the mobile body is lower (higher). Therefore, the information processing device can make it easy for the mobile body to reach a destination without colliding (coming into contacting) with an obstacle during movement.

The generation unit generates, based on the score change rate, a moving route of the mobile body passing a position where the score change rate exceeds the first threshold in the moving environment.

Accordingly, for example, the information processing device can generate the moving route of the mobile body to pass a place where the estimation accuracy of the self-position of the mobile body is high. Therefore, the information processing device can make it possible to improve the estimation accuracy of the self-position of the mobile body.

The generation unit generates the moving route of the mobile body based on a history of the score change rate in a moving time in which the mobile body moves from a departure place to a destination.

Accordingly, the information processing device can generate a moving route of the mobile body in which the estimation accuracy of the self-position of the mobile body is higher. Therefore, the information processing device can make it possible to improve the estimation accuracy of the self-position of the mobile body.

The information processing device further includes a drive control unit (the drive control unit 154 in the embodiment) that controls driving of the mobile body. The drive control unit controls, according to the score change rate at the current position of the mobile body, the driving of the mobile body such that the mobile body moves in a direction in which the score change rate is easily increased.

Accordingly, the information processing device can move the mobile body in a direction in which the estimation accuracy of the self-position of the mobile body is higher.

Therefore, the information processing device can make it possible to improve the estimation accuracy of the self-position of the mobile body.

The information processing device further includes an estimation unit (the estimation unit 153 in the embodiment) that estimates the self-position of the mobile body. The estimation unit estimates the self-position based on the same kind of sensor information as the sensor information used for generating the second map information.

Accordingly, the information processing device can effectively utilize the second map information (the score gradient map in the embodiment).

The information processing device further includes an estimation unit (the estimation unit 153 in the embodiment) that estimates the self-position of the mobile body. The acquisition unit respectively acquires sensor information of each of a plurality of sensors of the mobile body. The estimation unit determines weights of the sensors based on the change rate of scores indicating matching degrees between the first map information and pieces of sensor information and estimates the self-position based on the pieces of sensor information corresponding to the determined weights of the sensors.

Accordingly, since the information processing device can appropriately combine a plurality of pieces of sensor information, the information processing device can make it possible to further improve the estimation accuracy of the self-position of the mobile body.

The acquisition unit respectively generates a plurality of pieces of first map information based on the sensor information of each of the plurality of sensors of the mobile body. The generation unit respectively generates a plurality of pieces of second map information based on the sensor information of each of the plurality of sensors.

Accordingly, since the information processing device can appropriately combine the plurality of pieces of second map information, the information processing device can make it possible to further improve the estimation accuracy of the self-position of the mobile body.

The information processing device further includes an output control unit (the output control unit 155 in the embodiment) that outputs information to the terminal device of the user. The output control unit outputs, based on the score change rate, to the terminal device, information concerning a position where the score change rate is the second threshold or less in the moving environment.

Accordingly, when there is a place where the estimation accuracy of the self-position of the mobile body is low, the information processing device can urge the user to correct the moving environment of the mobile body.

The output control unit outputs, based on the score change rate, to the terminal device, information concerning whether the stop accuracy of the mobile body at the positions in the moving environment can be set or a set numerical value of the stop accuracy.

Accordingly, the information processing device can appropriately notify the information concerning the stop accuracy of the mobile body to the user.

6. Hardware Configuration

Figure 8:
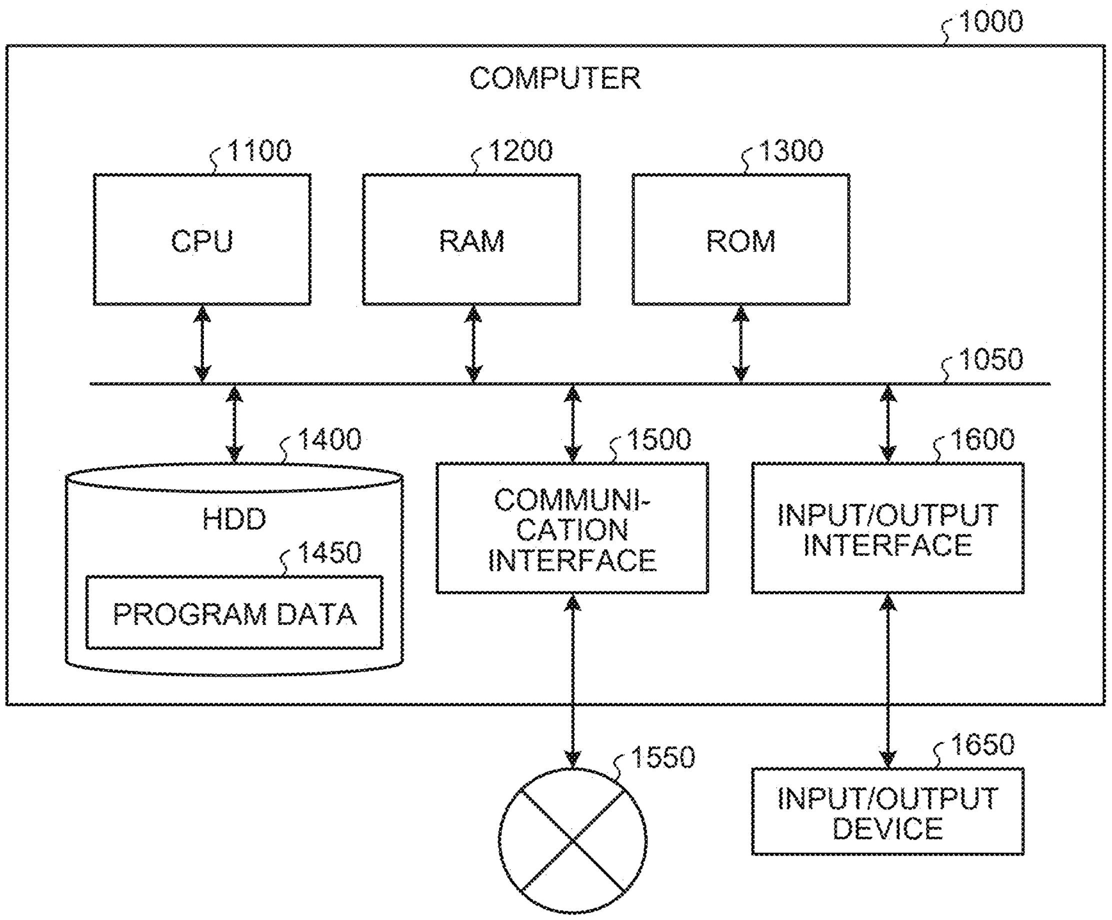
FIG. 8 is a hardware configuration diagram illustrating an example of a computer that implements functions of an information processing device.

Information equipment such as the mobile body device 100 according to the embodiment explained above is reproduced by, for example, a computer 1000 having a configuration illustrated in FIG. 8. FIG. 8 is a hardware configuration diagram illustrating an example of the computer 1000 that reproduces the functions of the information processing device such as the mobile body device 100. In the following explanation, the mobile body device 100 according to the embodiment is explained as an example. The computer 1000 includes a CPU 1100, a RAM 1200, a ROM (Read Only Memory) 1300, an HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 loads the programs stored in the ROM 1300 or the HDD 1400 in the RAM 1200 and executes processing corresponding to various programs.

The ROM 1300 stores a boot program such as a BIOS (Basic Input Output System) executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records a program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, when the computer 1000 functions as the mobile body device 100 according to the embodiment, the CPU 1100 of the computer 1000 reproduces the functions of the control unit 150 and the like by executing a program loaded on the RAM 1200. The HDD 1400 stores a program according to the present disclosure and various data. Note that the CPU 1100 reads the program data 1450 from the HDD 1400 and executes the program data 1450. However, as another example, the CPU 1100 may acquire these programs from another device via the external network 1550.

The effects described in the present specification are only explanatory or illustrative and are not limiting. That is, the technique according to the present disclosure can achieve other effects obvious for those skilled in the art from the description of the present specification together with or instead of the effects explained above.

Note that the present technique can also take the following configurations.

(1)

An information processing device comprising:

an acquisition unit that acquires first map information concerning a first map corresponding to a moving environment of a mobile body, the first map being generated in advance, and sensor information of the mobile body at positions in the moving environment; and a generation unit that generates second map information concerning a second map indicating a score change rate indicating a matching degree between the first map information and the sensor information, the change rate being the score change rate at the positions in the moving environment.

(2)

The information processing device according to (1), wherein the acquisition unit acquires the sensor information at positions in a movable region, which is a region where movement by the mobile body is possible, in the moving environment, and the generation unit generates the second map information concerning the second map indicating the score change rate at the positions in the movable region in the moving environment.

(3)

The information processing device according to (1) or (2), wherein the generation unit changes, according to the score change rate, a size of a prohibited region, which is a region where movement by the mobile body is prohibited, in the moving environment.

(4)

The information processing device according to any one of (1) to (3), wherein the generation unit generates, based on the score change rate, a moving route of the mobile body passing a position where the score change rate exceeds a first threshold in the moving environment.

(5)

The information processing device according to any one of (1) to (4), wherein the generation unit generates a moving route of the mobile body based on a history of the score change rate in a moving time in which the mobile body moves from a departure place to a destination.

(6)

The information processing device according to any one of (1) to (5), further comprising a drive control unit that controls driving of the mobile body, wherein the drive control unit controls, according to the score change rate at a current position of the mobile body, the driving of the mobile body such that the mobile body moves in a direction in which the score change rate is easily increased.

(7)

The information processing device according to any one of (1) to (6), further comprising an estimation unit that estimates a self-position of the mobile body, wherein the estimation unit estimates the self-position based on a same kind of sensor information as the sensor information used for generating the second map information.

(8)

The information processing device according to any one of (1) to (7), further comprising an estimation unit that estimates a self-position of the mobile body, wherein the acquisition unit respectively acquires sensor information of each of a plurality of sensors of the mobile body, and the estimation unit determines weights of the sensors based on a change rate of scores indicating a matching degree between the first map information and pieces of sensor information and estimates the self-position based on the pieces of sensor information corresponding to the determined weights of the sensors.

(9)

The information processing device according to any one of (1) to (8), wherein the acquisition unit respectively generates a plurality of pieces of the first map information based on sensor information of each of a plurality of sensors of the mobile body, and the generation unit respectively generates a plurality of pieces of the second map information based on the sensor information of each of the plurality of sensors.

(10)

The information processing device according to any one of (1) to (9), further comprising an output control unit that outputs information to a terminal device of a user, wherein the output control unit outputs, based on the score change rate, to the terminal device, information concerning a position where the score change rate is a second threshold or smaller in the moving environment.

(11)

The information processing device according to (10), wherein the output control unit outputs, based on the score change rate, to the terminal device, information concerning whether setting of stop accuracy of the mobile body at the positions in the moving environment is possible or a set numerical value of the stop accuracy.

(12)

An information processing method comprising:

acquiring first map information concerning a first map corresponding to a moving environment of a mobile body, the first map being generated in advance, and sensor information of the mobile body at positions in the moving environment; and generating second map information concerning a second map indicating a score change rate indicating a matching degree between the first map information and the sensor information, the change rate being the score change rate at the positions in the moving environment.

(13)

An information processing program for causing a computer to function to:

acquire first map information concerning a first map corresponding to a moving environment of a mobile body, the first map being generated in advance, and sensor information of the mobile body at positions in the moving environment; and generate second map information concerning a second map indicating a score change rate indicating a matching degree between the first map information and the sensor information, the change rate being the score change rate at the positions in the moving environment.

REFERENCE SIGNS LIST

100 MOBILE BODY DEVICE
110 SENSOR UNIT
120 COMMUNICATION UNIT
130 STORAGE UNIT
140 DRIVE UNIT
150 CONTROL UNIT
151 ACQUISITION UNIT
152 GENERATION UNIT
153 ESTIMATION UNIT
154 DRIVE CONTROL UNIT
155 OUTPUT CONTROL UNIT

The invention claimed is:

1. An information processing device, comprising:
a central processing unit (CPU) configured to:
acquire first map information associated with a first map, wherein
the first map corresponds to a moving environment of a mobile body, and
generation of the first map is before the acquisition of the first map information;
acquire first sensor information of the mobile body at a plurality of positions, wherein the moving environment includes the plurality of positions;
generate second map information associated with a second map, wherein
the second map indicates a score change rate,
the score change rate indicates a matching degree between the first map information and the first sensor information, and
the score change rate is associated with the plurality of positions;
change a size of a prohibited region based on the score change rate; and
control, based on the score change rate, a movement of the mobile body in the moving environment, wherein
the moving environment includes the prohibited region, and
the movement of the mobile body is prohibited in the prohibited region.

2. The information processing device according to claim 1, wherein
the moving environment includes a movable region,
the movable region includes each of the plurality of positions,
the mobile body moves in the movable region, and
the second map information is associated with the movable region.

3. The information processing device according to claim 1, wherein
the CPU is further configured to generate, based on the score change rate, a moving route of the mobile body,
the mobile body passes through a specific position on the moving route,
the plurality of positions includes the specific position, and
the score change rate is greater than a threshold value at the specific position.

4. The information processing device according to claim 1, wherein
the CPU is further configured to generate a moving route of the mobile body based on a history of the score change rate,
the history of the score change rate is associated with a moving time, and
the mobile body moves from a departure place to a destination in the moving time.

5. The information processing device according to claim 1, wherein
the CPU is further configured to control, based on the score change rate, the movement of the mobile body such that the mobile body moves in a specific direction,
the score change rate is associated with a current position of the mobile body, and
the specific direction is associated with an increment of the score change rate.

6. The information processing device according to claim 1, wherein
the CPU is further configured to estimate a self-position of the mobile body based on second sensor information, and
each of the first sensor information and the second sensor information is of a specific type.

7. The information processing device according to claim 1, wherein the CPU is further configured to:
acquire the first sensor information from a plurality of sensors of the mobile body, wherein
the first sensor information includes a plurality of pieces of sensor information, and
each of the plurality of pieces of sensor information is associated with a respective sensor of the plurality of sensors,
determine a respective weight value of each of the plurality of sensors based on a change rate of a plurality of scores, wherein the change rate of the plurality of scores indicates a matching degree between the first map information and the plurality of pieces of sensor information; and
determine a self-position of the mobile body based on the plurality of pieces of sensor information, wherein each of the plurality of pieces of sensor information corresponds to the respective weight value of the respective sensor.

8. The information processing device according to claim 1, wherein the CPU is further configured to:
acquire the first sensor information from each of a plurality of sensors of the mobile body;
generate a plurality of pieces of the first map information based on the first sensor information; and
generate a plurality of pieces of the second map information based on the first sensor information.

9. The information processing device according to claim 1, wherein
the CPU is further configured to output specific information to a terminal device of a user,
the specific information is associated with a specific position in the moving environment,
the plurality of positions includes the specific position, and
the score change rate, at the specific position, is at least one of equal to a threshold value or less than the threshold value.

10. The information processing device according to claim 9, wherein
the CPU is further configured to output the specific information to the terminal device based on the score change rate, the specific information is associated with at least one of a possibility to set a stop accuracy of the mobile body at the plurality of positions in the moving environment, or a specific numerical value of the stop accuracy.

11. An information processing method, comprising:

acquiring first map information associated with a first map, wherein the first map corresponds to a moving environment of a mobile body, and generation of the first map is before the acquisition of the first map information;

acquiring sensor information of the mobile body at a plurality of positions, wherein the moving environment includes the plurality of positions; and generating second map information associated with a second map, wherein the second map indicates a score change rate, the score change rate indicates a matching degree between the first map information and the sensor information, and the score change rate is associated with the plurality of positions;

changing a size of a prohibited region based on the score change rate; and controlling, based on the score change rate, a movement of the mobile body in the moving environment, wherein the moving environment includes the prohibited region, and the movement of the mobile body is prohibited in the prohibited region.

12. A non-transitory computer-readable medium having stored thereon, computer executable instructions which when executed by a computer, cause the computer to execute operations, the operations comprising:

acquiring first map information associated with a first map, wherein the first map corresponds to a moving environment of a mobile body, and generation of the first map is before the acquisition of the first map information;

acquiring sensor information of the mobile body at a plurality of positions, wherein the moving environment includes the plurality of positions; and generating second map information associated with a second map, wherein the second map indicates a score change rate, the score change rate indicates a matching degree between the first map information and the sensor information, and the score change rate is associated with the plurality of positions;

changing a size of a prohibited region based on the score change rate; and controlling, based on the score change rate, a movement of the mobile body in the moving environment, wherein the moving environment includes the prohibited region, and the movement of the mobile body is prohibited in the prohibited region.

* * * * *